US011971644B2

United States Patent
Embutsu et al.

(10) Patent No.: US 11,971,644 B2
(45) Date of Patent: Apr. 30, 2024

(54) WAVELENGTH CONVERSION DEVICE

(71) Applicant: Nippon Telegraph and Telephone Corporation, Tokyo (JP)

(72) Inventors: Koji Embutsu, Musashino (JP);
Ryoichi Kasahara, Musashino (JP);
Osamu Tadanaga, Musashino (JP);
Takeshi Umeki, Musashino (JP);
Takahiro Kashiwazaki, Musashino (JP); Takushi Kazama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 405 days.

(21) Appl. No.: 17/294,209

(22) PCT Filed: Nov. 12, 2019

(86) PCT No.: PCT/JP2019/044339
§ 371 (c)(1),
(2) Date: May 14, 2021

(87) PCT Pub. No.: WO2020/105509
PCT Pub. Date: May 28, 2020

(65) Prior Publication Data
US 2022/0004081 A1 Jan. 6, 2022

(30) Foreign Application Priority Data
Nov. 20, 2018 (JP) .................. 2018-217436

(51) Int. Cl.
*G02F 1/377* (2006.01)
*G02F 1/35* (2006.01)

(52) U.S. Cl.
CPC .......... *G02F 1/3775* (2013.01); *G02F 1/3546* (2021.01); *G02F 2202/20* (2013.01)

(58) Field of Classification Search
CPC .................................................... G02F 1/3546
See application file for complete search history.

(56) References Cited

U.S. PATENT DOCUMENTS 5,991,067 A * 11/1999 Minakata ................ G02F 1/035
359/332
6,289,029 B1 * 9/2001 Goto ....................... H01S 3/042
372/32

(Continued)

FOREIGN PATENT DOCUMENTS

CN        160 133 2 A       3/2005
JP        H11-103119 A      4/1999

(Continued)

OTHER PUBLICATIONS

Sanna S, Schmidt WG. LiNbO3 surfaces from a microscopic perspective. J Phys Condens Matter. Oct. 18, 2017;29(41):413001. doi: 10.1088/1361-648X/aa818d. Epub Jul. 24, 2017. PMID: 28737161. (Year: 2017).*

*Primary Examiner* — Rhonda S Peace
(74) *Attorney, Agent, or Firm* — Workman Nydegger

(57) ABSTRACT

Reduction of output power of light with a wavelength converted is suppressed, which is caused by a pyroelectric effect that occurs when a temperature of a wavelength conversion element including a ferroelectric substrate is changed. Provided is a wavelength conversion device that generates light different from a wavelength of a signal light when the signal light is inputted, and includes a wavelength conversion element that converts a wavelength of the signal light, and a temperature control element for controlling a temperature of the wavelength conversion element, wherein the wavelength conversion element and the temperature control element are sealed in an inside of a metal casing, the inside of the metal casing is filled with dry gas including one kind or more selected from nitrogen, oxygen, argon or (Continued)

helium, the wavelength conversion element includes an optical waveguide core and a substrate having a lower refractive index to the signal light than the optical waveguide core, and the substrate is a ferroelectric substance in which directions of spontaneous polarization are random.

9 Claims, 5 Drawing Sheets

(56) References Cited

U.S. PATENT DOCUMENTS

| | | | |
|---|---|---|---|
| 2005/0068998 A1* | 3/2005 | Katsura | G02F 1/3501 |
| | | | 372/21 |
| 2012/0081772 A1* | 4/2012 | Okazaki | G02F 1/292 |
| | | | 359/245 |
| 2013/0235895 A1 | 9/2013 | Mizuuchi et al. | |
| 2022/0004081 A1* | 1/2022 | Embutsu | G02F 1/3551 |

FOREIGN PATENT DOCUMENTS

| | | |
|---|---|---|
| JP | 2001-119090 A | 4/2001 |
| JP | 2002-006353 A | 1/2002 |
| JP | 2005-202334 A | 7/2005 |
| JP | 2005-215186 A | 8/2005 |
| JP | 3753236 B2 | 12/2005 |
| JP | 2007-316541 A | 12/2007 |
| JP | 2008-117980 A | 5/2008 |
| WO | 2012/066596 A1 | 5/2012 |

\* cited by examiner

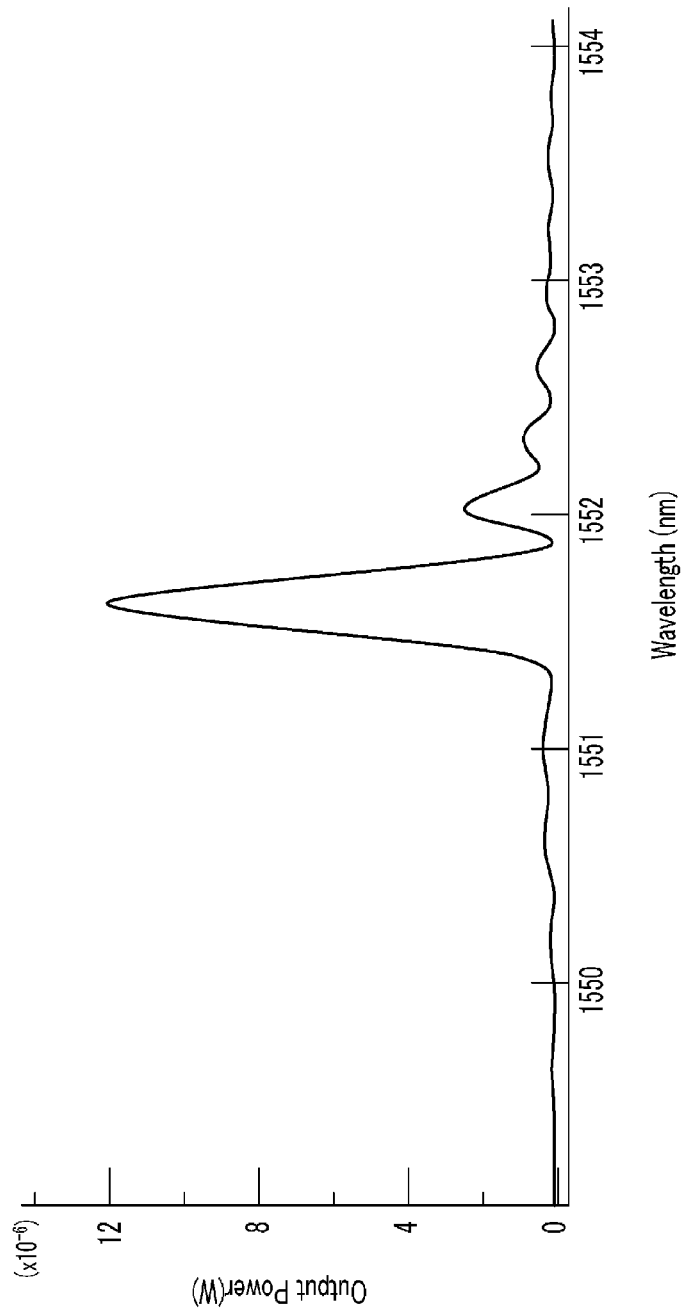

WAVELENGTH CONVERSION DEVICE

TECHNICAL FIELD

The present invention relates to a wavelength conversion device.

BACKGROUND ART

An optical waveguide using periodically poled lithium niobate (Periodically Poled Lithium Niobate, hereinafter referred to as PPLN) is an element capable of realizing increase in light intensity by being used as a waveguide, and high wavelength conversion efficiency by using a quasi-phase-matched technology. Therefore, optical waveguides using PPLN attract attention as devices that play an important role in a next-generation optical fiber communication field and a field of quantum computing. The optical waveguides using PPLN are used as a parametric amplification element configuring a phase sensitive amplifier (PAS) capable of low noise optical amplification and an excitation light generation element, and realize high-gain and low-noise optical amplification characteristics. Further, in the field of quantum computing, it is reported that by inserting an optical waveguide using PPLN into a fiber ring resonator and using it as a parametric oscillation element, high-capacity calculations are demonstrated at an extremely high speed as compared with the conventional calculators. In order to further improve the performance of these technologies, it is important to realize a wavelength conversion device having higher wavelength conversion efficiency.

FIG. 1 is a view illustrating a basic configuration of a conventional wavelength conversion device 10 that generates a difference frequency by a quasi-phase-matched (Quasi-Phase-Matched, hereinafter referred to as QPM) technology. The configuration of the wavelength conversion device 10 in FIG. 1 is disclosed in Patent Literature 1. As illustrated in FIG. 1, a signal light 1a with low light intensity and a control light 1b with high light intensity are incident on a multiplexer 14 and are combined. The signal light 1a combined with the control light 1b travels toward a wavelength conversion element 13 including a substrate 12 and an optical waveguide core 11 disposed on the substrate 12. The signal light 1a combined with the control light 1b is incident on one end of the optical waveguide core 11 that has a periodically poled structure and exhibits a nonlinear optical effect. The signal light 1a is converted into a difference frequency light 1c having a different wavelength from the signal light 1a at a time of passing in the optical waveguide core 11, and is emitted from the other end of the optical waveguide core 11 with the control light 1b. The difference frequency light 1c and the control light 1b that are emitted from the optical waveguide core 11 are incident on a demultiplexer 15 and are separated from each other.

Further, there are also known several methods for producing an optical element (hereinafter, referred to as a wavelength conversion element) that performs wavelength conversion by using the quasi-phase-matched technology. For example, there is a method for producing a proton exchange waveguide by using a periodically poled structure after causing a crystal (hereinafter, referred to as a nonlinear optical crystal) substrate that exhibits a nonlinear optical effect to have the periodically poled structure. Further, for example, there is a method for producing a ridge optical waveguide by using a photolithography process and a dry etching process after causing a nonlinear optical crystal substrate to have a periodically poled structure similarly.

Patent Literature 1 discloses an example of producing the ridge optical waveguide, out of these methods. Patent Literature describes that a wavelength conversion element is produced by bonding a first substrate of a nonlinear optical crystal having a periodically poled structure and a second substrate having a smaller refractive index than a refractive index of the first substrate, in order to improve a light confinement effect in the ridge optical waveguide. Further, Patent Literature 1 describes that in order to avoid crack due to deterioration of an adhesive and a temperature change, a nonlinear optical crystal of the same type as the first substrate is used as the second substrate, and the first substrate and the second substrate are given heat to be diffusion-bonded.

It is known that a wavelength conversion device including a wavelength conversion element is practically used with the wavelength conversion element as well as the multiplexer and the demultiplexer housed in a metal casing including an input/output port capable of inputting and outputting light, so that characteristics are not deteriorated due to a change in a use environment. Further, wavelength conversion efficiency of the wavelength conversion element has a temperature dependency, and in order to maximize the wavelength conversion efficiency, it is necessary to control a temperature of the wavelength conversion element. For this purpose, in the wavelength conversion device, a temperature control element is further housed inside of the metal casing.

FIG. 2 is a view illustrating a configuration example of a wavelength conversion device 20 further including a metal casing 29 and a temperature control element 26 in the configuration of the wavelength conversion device 10 in FIG. 1. The configuration of the wavelength conversion device illustrated in FIG. 2 includes the metal casing 29, the temperature control element 26, an upper member 27, and a metal casing bottom surface member 28 in addition to the configuration illustrated in FIG. 1. The metal casing 29 includes an input port 200 and an output port 201 for inputting and outputting light, and inputting and outputting electric signals for temperature control, in side surfaces. The upper member 27 is a metal member for controlling a temperature of the entire wavelength conversion element 13 including the optical waveguide core 11 and the substrate 12 uniformly. The temperature control element 26 is interposed between the upper member 27 and the metal casing bottom surface member 28. Note that the optical waveguide core 11, the substrate 12, the wavelength conversion element 13, the multiplexer 14, the demultiplexer 15, the signal light 1a, and the difference frequency light 1c are the same as those in the explanation of FIG. 1, and therefore explanation will be omitted.

Further, when a wavelength conversion element using a ferroelectric crystal material in the wavelength conversion device, a phenomenon called an optical damage occurs, in which a refractive index of the wavelength conversion element changes by irradiation of light having a short wavelength and characteristics decline. As a method for suppressing an influence by the optical damage, it is proposed to use the wavelength conversion element at a high temperature.

CITATION LIST

Patent Literature

Patent Literature 1: Japanese Patent No. 3753236

SUMMARY OF THE INVENTION

Technical Problem

In order to operate the wavelength conversion element at a high temperature, a method of heating the wavelength conversion element by using a heat source such as a heater is conceivable. For example, in the wavelength conversion device 20 illustrated in FIG. 2, it is necessary to perform temperature control of the wavelength conversion element 13 at high speed with high precision, and therefore a Peltier element is used as the temperature control element 26. When the temperature of the wavelength conversion element 13 is set at a high temperature by using a Peltier element, events described as follows become a problem.

Here, a Peltier element is an element that uses an effect that when a current is passed to the Peltier element, heat absorption occurs on one surface, and heat generation occurs on the other surface at the same time. Therefore, when the temperature of the wavelength conversion element 13 is set at a higher temperature than an ambient temperature of the wavelength conversion element 13, it is assumed that condensation dew occurs on a heat absorption side under an atmospheric environment. When water generated by dew condensation stays inside the Peltier element and in a vicinity of a lead wire electrode, solder that joins the Peltier element and the lead wire electrode are corroded by water, and the Peltier element and the lead wire electrode are electrically disconnected and damaged. Alternatively, when the water generated by dew condensation contacts a plurality of electrodes, solder components repeat anode elution and cathode precipitation via water due to a potential difference among the electrodes, as a result of which, the plurality of electrodes are short-circuited and the wavelength conversion element 13 fails. Therefore, in order to realize the wavelength conversion device 20 with high reliability, it is necessary to hermetically seal the wavelength conversion device 20 in a dry gas atmosphere containing no water.

However, when the wavelength conversion device 20 is hermetically sealed in the dry gas atmosphere, no atmospheric ion exists in the wavelength conversion device 20, and therefore it is not possible to neutralize surface charges on the substrate 12, which occur due to a pyroelectric effect of the substrate 12 that is a ferroelectric substance when the temperature of the wavelength conversion element 13 is changed. At this time, a refractive index distribution of the substrate 12 occurs. Further, change in surface charges due to the pyroelectric effect on the surface of the substrate 12 also affects the inside of the optical waveguide core 11 and generates an ununiform distribution in a charge density in the inside of the optical waveguide core 11. Therefore, an ununiform refractive index distribution also occurs to the inside of the optical waveguide core 11. As a result, there has been a problem that a wavelength satisfying the phase matching condition changes in the optical waveguide core 11, and output power of the difference frequency light 1c which is subjected to wavelength conversion declines.

Means for Solving the Problem

The present invention is made to solve the above described problem. One embodiment of the present invention is a wavelength conversion device that generates light of a different wavelength from a wavelength of a signal light when the signal light is inputted, and includes a wavelength conversion element that converts a wavelength of the signal light, and a temperature control element for controlling a temperature of the wavelength conversion element. Here, the wavelength conversion element and the temperature control element are sealed in an inside of a metal casing, the inside of the metal casing is filled with dry gas including one kind or more selected from nitrogen, oxygen, argon or helium, the wavelength conversion element includes an optical waveguide core and a substrate having a lower refractive index to the signal light than the optical waveguide core, and the substrate is a ferroelectric substance in which directions of spontaneous polarization are random.

Effects of the Invention

According to the present invention, the wavelength conversion device can be provided, which can suppress decline of output power of light that is converted in wavelength, and is caused by a pyroelectric effect that occurs when the temperature of the wavelength conversion element including the ferroelectric substrate is changed.

BRIEF DESCRIPTION OF DRAWINGS

FIG. 5 is a graph showing a phase matching characteristic of the wavelength conversion device 30 in a case where the substrate 32 is heated for two hours at 650° C. in the dry nitrogen gas atmosphere.

DESCRIPTION OF EMBODIMENTS

An operation principle of a wavelength conversion device of one embodiment of the present invention will be described. The wavelength conversion device of one embodiment of the present invention uses a ferroelectric crystal as a substrate that is a lower portion of a ridge optical waveguide of a wavelength conversion element. The substrate is cooled after heated at a Curie temperature or more once. By the heating and cooling treatments, polarization in directions different from a polarization direction before heating occurs at random in the substrate that is a dielectric crystal, and therefore a polarization direction of the ferroelectric substance is not single. The ferroelectric crystal having random polarization directions instead of a single polarization direction resultantly has a smaller pyroelectric effect than ferroelectric crystal having a single polarization direction, because electric fields due to polarization in different directions respectively cancel each other out inside of the ferroelectric crystal.

In other words, in the substrate before heating, macroscopically and microscopically, directions of spontaneous polarization are aligned in a fixed direction. On the other hand, in the substrate after heating, a part in a domain where the directions of spontaneous polarization are random is generated. The effect that the pyroelectric effect becomes smaller than the ferroelectric crystal of single polarization described above is realized by a structural change of the substrate.

The wavelength conversion device that is one embodiment of the present invention has a technical feature that before and after the heating and cooling treatments, values of a refractive index, a transmissivity and a linear expansion coefficient of the substrate that affect the output power of light that is converted in wavelength are almost unchanged, although piezoelectricity, electrostrictive characteristics and nonlinear optical characteristics that are the characteristics of the substrate are impaired. Since the wavelength conversion device that is one embodiment of the present invention has the technical feature, it is possible to use the wavelength conversion device while suppressing the pyroelectric effect of the substrate even in a dry gas atmosphere.

Example

Figure 2:
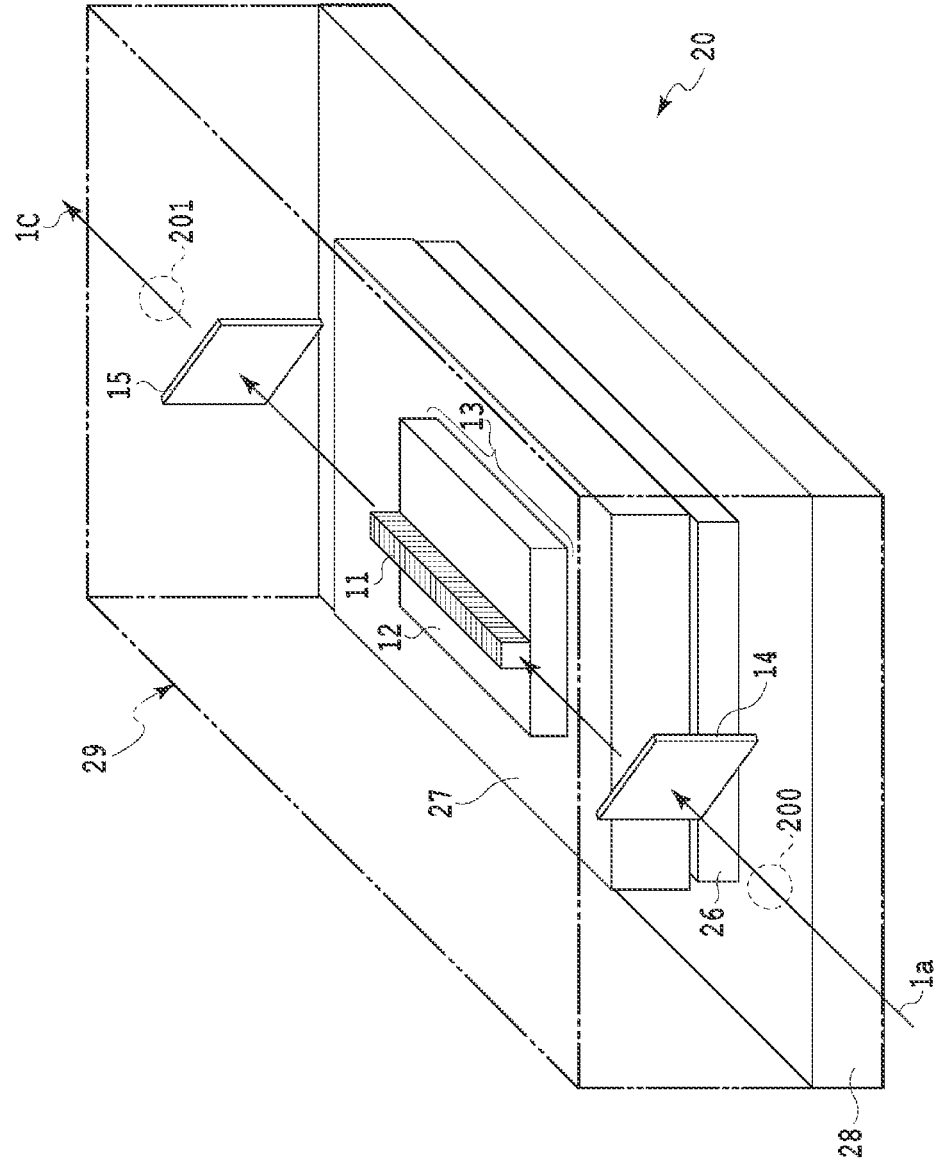
FIG. 2 is a view illustrating a configuration example of a wavelength conversion device further including a metal casing 29 and a temperature control element 26 in a configuration of the wavelength conversion device 10 in FIG. 1.
Figure 3:
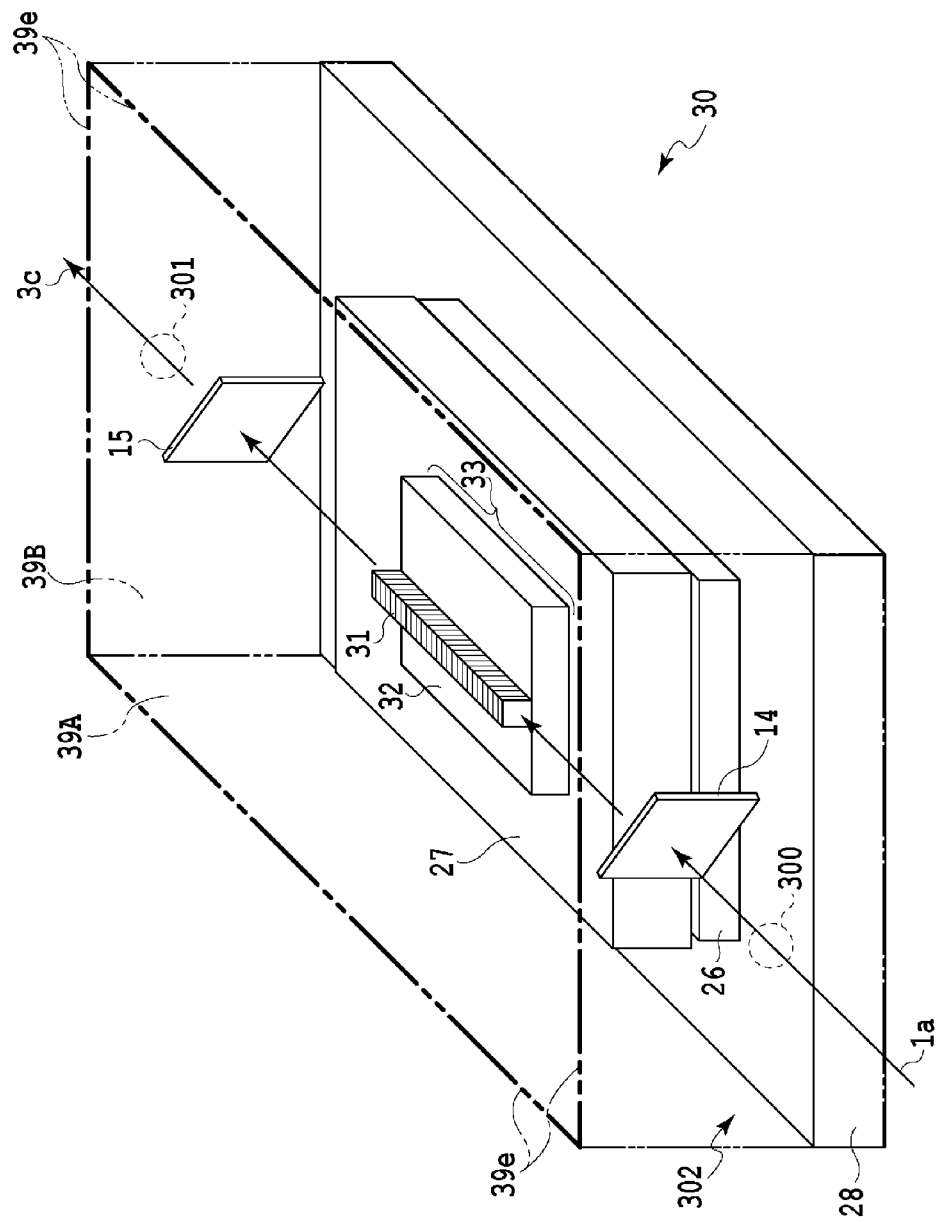
FIG. 3 is a view illustrating a configuration of a wavelength conversion device 30 that is one embodiment of the present invention.

FIG. 3 is a view illustrating a configuration of a wavelength converter 30 that is one embodiment of the present invention. The wavelength converter 30 is such a wavelength conversion device that when a fundamental wave of a wavelength of 1550 nm is inputted from an input port 300 as a signal light 1a, a signal light 3c with a wavelength converted that is a second harmonic wave thereof and has a wavelength (775 nm) is outputted from an output port 301. The configuration of the wavelength conversion device 30 illustrated in FIG. 3 is same as the configuration of the wavelength conversion device 20 illustrated in FIG. 2. A difference is that a substrate 32 of a wavelength conversion element 33 adopts a ferroelectric crystal whose polarization directions are not single but random.

First, the configuration of the wavelength conversion device 30 will be described. The wavelength conversion device 30 includes a multiplexer 14 that combines the signal light 1a and control light (not illustrated), the wavelength conversion element 33 including an optical waveguide core 31 and a substrate 32, and a demultiplexer 15 that separates the signal light 3c with a wavelength converted and the control light (not illustrated). A metal casing including a first portion 39A of the metal casing and a second portion 39B of the metal casing is included to seal these elements, and inside the metal casing, a temperature control element 26, an upper member 27 and a metal casing bottom surface member 28 are further included.

Figure 1:
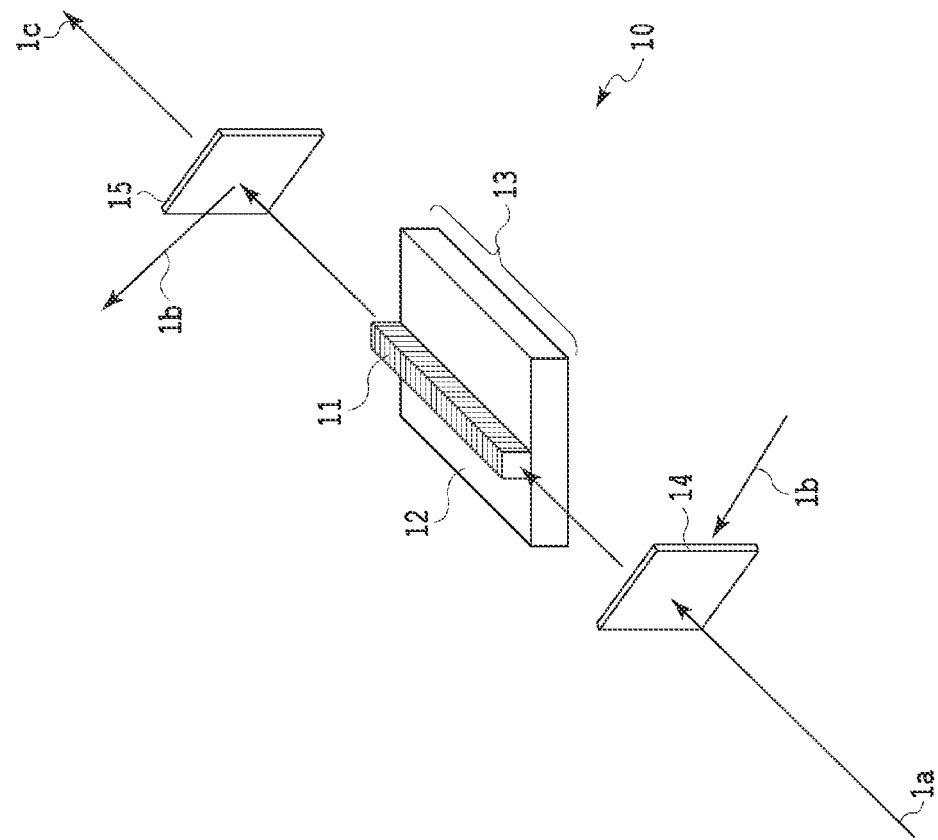
FIG. 1 is a view illustrating a basic configuration example of a conventional wavelength conversion device 10 that generates a difference frequency by a quasi-phase-matched technology.

The metal casing including the first portion 39A of the metal casing and the second portion 39B of the metal casing includes the input port 300 and the output port 301 for inputting and outputting light and inputting and outputting electric signals for temperature control, in side surfaces. Note that the multiplexer 14, the demultiplexer 15, and the signal light 1a are same as those in the explanation of FIG. 1, and therefore explanation will be omitted.

The optical waveguide core 31 is an optical waveguide that allows the signal light 1a to pass through an inside thereof selectively without losing intensity of the signal light 1a. A structure of the optical waveguide core 31 is not specially limited as long as the optical waveguide core has a function of outputting the signal light 3c with a wavelength converted, which has a different wavelength from the signal light 1a when the wavelength of the signal light 1a is inputted. The structure of the optical waveguide core 31 is a structure in which a quadratic nonlinear constant changes along a traveling direction of light periodically or at a period to which a predetermined modulation is given, and realizes quasi-phase matching for a single wavelength or a plurality of wavelengths, and it is also possible to adopt a multi QPM element, for example.

The substrate 32 is a substrate that is a ferroelectric and transparent to the signal light 1a, that is, does not cause light absorption. The substrate 32 is caused to function as an underclad to the optical waveguide core 31 when the ridge optical waveguide is configured, and needs to have a lower refractive index to the signal light 1a, the control light (not illustrated), and the signal light 3c with the wavelength converted, than the optical waveguide core 31.

The ferroelectric material adopted for the substrate 32 is $LiNbO_3$, $KNbO_3$ (potassium niobate), $LiTaO_3$ (lithium tantalate), $LiNb(x)Ta(1-x)O_3$ ($0 \leq x \leq 1$) (lithium tantalate of a nonstoichiometric composition), or $KTiOPO_4$ (potassium titanate phosphate), and preferably further includes at least one selected from Mg (magnesium), Zn (zinc), Sc (scandium) and In (indium) as an additive therein.

The metal casing is a metal casing that joins the first portion 39A of the metal casing and the second portion 39B of the metal casing, and seals an inside so as to keep the inside airtight.

The upper member 27 is a metal member for controlling a temperature of the entire wavelength conversion element 33 including the optical waveguide core 31 and the substrate 32 uniformly.

Here, linear expansion coefficients of the upper member 27 and the metal casing bottom surface member 28 are preferably substantially equal to a linear expansion coefficient of the temperature control element 26 to suppress deformation of the upper member 27 and the metal casing bottom surface member 28 due to thermal stress that occurs due to a temperature change of the temperature control element 26. Specifically, the linear expansion coefficient of the upper member 27 is preferably $10 \times 10^{-6}$/K or more and $20 \times 10^{-6}$/K or less.

Further, a material of the upper member preferably includes one kind of metal or more selected from stainless steel, copper molybdenum steel, carbon steel, chrome molybdenum steel, copper, phosphorus deoxidized copper, oxygen free copper, phosphorus bronze, or brass. In the present example, oxygen free copper is used as the upper member 27.

The metal casing bottom surface member 28 is a member that has high mechanical strength, and has a high thermal conductivity to transmit heat generation and heat absorption effects by the temperature control element 26 to the wavelength conversion element 33 efficiently.

The linear expansion coefficient of the metal casing bottom surface member 28 is preferably $4 \times 10^{-6}$/K or more and $12 \times 10^{-6}$/K or less.

Further, the linear expansion coefficients of the upper member 27 and the metal casing bottom surface member 28 are both set to be substantially equal to the linear expansion coefficient of the temperature control element 26, and thereby it is possible to further suppress deformation of the upper member 27 and the metal casing bottom surface member 28 due to thermal stress. In other words, a range of a value of the linear expansion coefficient of the metal casing bottom surface member 28 is more preferably substantially equal to a range of a value of the linear expansion coefficient of the upper member 27.

Further, a material of the metal casing bottom surface member preferably includes one kind of metal or more selected from tungsten, molybdenum, kovar, copper tungsten steel, stainless steel, or copper molybdenum steel. In the present example, stainless steel was used as the metal casing bottom surface member 28.

The temperature control element 26 is interposed between the upper member 27 and the metal casing bottom surface member 28. The temperature control element 26 is a Peltier element. Further, in order to efficiently transmit the heat generation and heat absorption effects to the upper member 27 and the metal casing bottom surface member 28, it is possible to adopt solder joining, joining with a conductive adhesive, or other known joining methods, as a joining method with the upper member 27 and the metal casing bottom surface member 28.

Dry gas 302 is gas that fills an inside of the metal casing and does not include water. In other words, as illustrated in FIG. 3, the dry gas 302 is an atmosphere around the wavelength conversion element 33, the temperature control element 26, the upper member 27 and the metal casing bottom surface member 28 that are sealed in the metal casing.

The dry gas 302 preferably includes one kind or more selected from nitrogen, oxygen, argon or helium. In the present example, dry nitrogen gas was used as the dry gas 302.

Next, a production method of the wavelength conversion device 30 will be described. Heating and cooling treatments are performed for the substrate 32, in advance. As the substrate 32, a crystal of LiTaO$_3$ of a thickness of 0.5 mm was put in an electric furnace, and was heated at 650° C. in a dry nitrogen gas atmosphere for two hours while the temperature was kept. After the heating, the substrate 32 was cooled until the temperature of the substrate 32 lowered to a room temperature.

By applying the heating and cooling treatments, directions of spontaneous polarization become random in the crystal of LiTaO$_3$ that is the substrate 32. As a result, in an inside of the substrate 32, electric fields by random polarization canceled each other out, and a pyroelectric effect decreased as compared with a case of single-direction polarization, and it was possible to decrease a surface charge density of the substrate 32.

The ferroelectric substrate 32 was used as a lower portion of the ridge optical waveguide, and the optical waveguide core 31 of PPLN and of 5 μm square was formed on the substrate 32 by dry etching.

An implementer fixed the wavelength conversion element 33 produced as above onto the upper member 27, and fixed and housed the upper member 27 and the metal casing bottom surface member 28 with the temperature control element 26 interposed therebetween, to and in an inside of the first portion 39A of the metal casing with an upper surface opened. After fixing, the first portion 39A of the metal casing and the first portion 39B of the metal casing were seam-welded in the dry nitrogen gas atmosphere, and thereby hermetical sealing of the metal casing was performed. Joining spots by seam welding are denoted by 39e.

Figure 4:
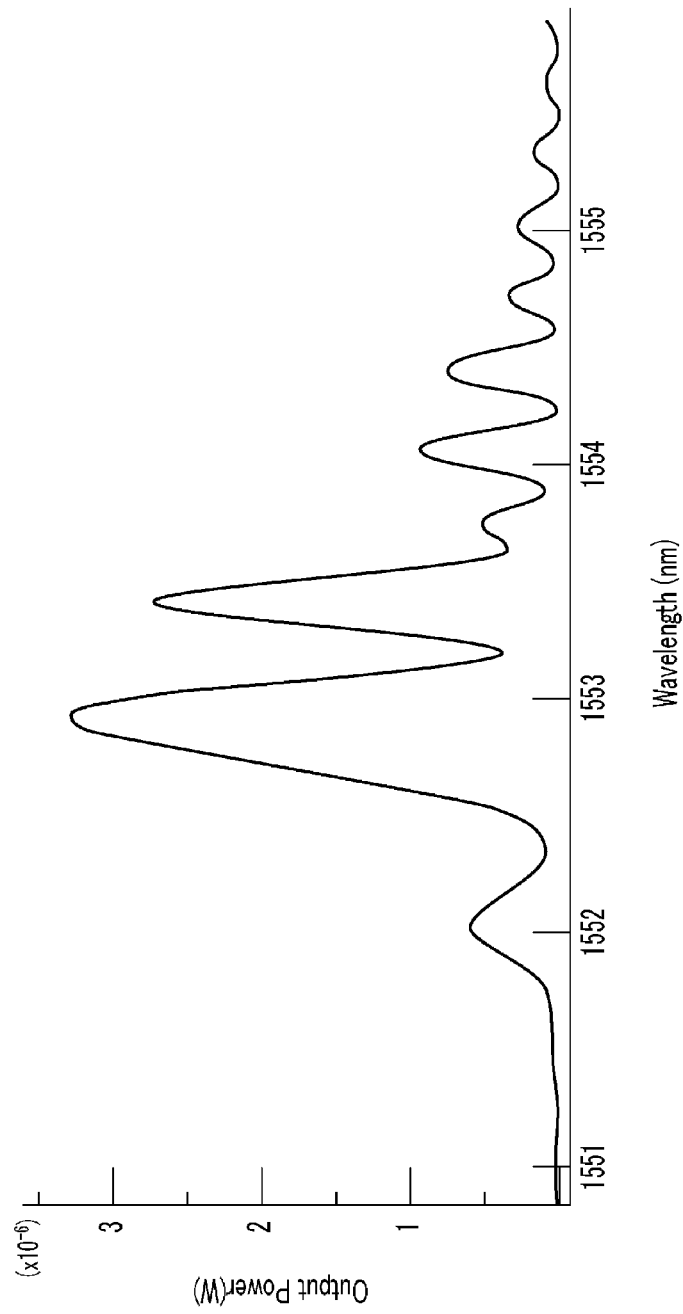
FIG. 4 is a graph showing a phase matching characteristic of the wavelength conversion device 30 in a case where a substrate is not heated for two hours at 650° C. in a dry nitrogen gas atmosphere.

FIG. 4 and FIG. 5 are graphs showing phase matching characteristics of the wavelength conversion device 30 in a case where the substrate 32 is not heated at 650° C. in the dry nitrogen gas atmosphere for two hours in advance (FIG. 4) and a case where the substrate 32 is heated (FIG. 5) respectively. In FIG. 4 and FIG. 5, horizontal axes each shows a wavelength of the signal light 3c that is converted in wavelength and outputted from the wavelength conversion device 30, and vertical axes each shows output power thereof.

In FIG. 4, it is found that the phase matching condition is not locally satisfied in the optical waveguide core 31 due to a refraction index change of the substrate 32 due to a pyroelectric characteristic of the substrate 32, greatly deviates from a characteristic expressed by a Sinc function that is a theoretical phase matching curve, and the wavelength conversion efficiency declines. On the other hand, it is found that when the substrate 32 to which the heating treatment is performed is applied as the substrate of the wavelength conversion element as illustrated in FIG. 5, an influence of the pyroelectric effect is suppressed more favorably, a shape of a phase matching curve is close to an idealistic Sinc function and a high wavelength conversion efficiency can be obtained, as compared with a phase matching characteristic in the case where heating and cooling treatment are not performed for the substrate 32 shown in FIG. 4.

REFERENCE SIGNS LIST 1a signal light
1b control light
1c difference frequency light
3c signal light with wavelength converted
10, 20, 30 wavelength conversion device
11, 31 optical waveguide core
12, 32 substrate
13, 33 wavelength conversion element
14 multiplexer
15 demultiplexer
26 temperature control element
27 upper member
28 metal casing bottom surface member
29 metal casing
39A first portion of metal casing
39B second portion of metal casing
39e joining portion of first portion of metal casing and second portion of metal casing
200, 300 input port
201, 301 output port
302 dry gas

The invention claimed is:

1. A wavelength conversion device that generates light different in wavelength from a signal light when the signal light is inputted, comprising:
   a wavelength conversion element that converts a wavelength of the signal light; and
   a temperature control element for controlling a temperature of the wavelength conversion element, wherein
   the wavelength conversion element and the temperature control element are sealed in an inside of a metal casing, and the inside of the metal casing is filled with dry gas including one or more selected from nitrogen, oxygen, argon or helium,
   the wavelength conversion element includes an optical waveguide core and a substrate having a lower refractive index to the signal light than the optical waveguide core, and
   the substrate is a ferroelectric substance in which directions of spontaneous polarization are random.

2. The wavelength conversion device according to claim 1, further comprising:
   a multiplexer that combines the signal light and control light; and a demultiplexer that separates the light different in wavelength from the signal light by the wavelength conversion element and the control light.

3. The wavelength conversion device according to claim 1, wherein
the temperature control element is a Peltier element,
the Peltier element is interposed between a first surface of an upper member and a metal casing bottom surface member disposed on a bottom surface of the metal casing, and the wavelength conversion element is placed on a second surface of the upper member, the second surface facing the first surface of the upper member,
the upper member is a metal member, and
values of linear expansion coefficients of the upper member and the metal casing bottom surface member are substantially equal values to a linear expansion coefficient of the Peltier element.

4. The wavelength conversion device according to claim 3, wherein
a linear expansion coefficient of the upper member is $10 \times 10^{-6}$/K or more and $20 \times 10^{-6}$/K or less.

5. The wavelength conversion device according to claim 3, wherein
a linear expansion coefficient of the metal casing bottom surface member is $4 \times 10^{-6}$/K or more and $12 \times 10^{-6}$/K or less.

6. The wavelength conversion device according to claim 3, wherein
a material of the upper member includes one or more selected from stainless steel, copper molybdenum steel, carbon steel, chrome molybdenum steel, copper, phosphorus deoxidized copper, oxygen free copper, phosphorus bronze, or brass.

7. The wavelength conversion device according to claim 3, wherein
a material of the metal casing bottom surface member includes one or more selected from tungsten, molybdenum, kovar, copper tungsten steel, stainless steel, or copper molybdenum steel.

8. The wavelength conversion device according to claim 1, wherein
the optical waveguide core has a quasi-phase-matched structure in which a quadric nonlinear constant inside the optical waveguide core changes periodically or randomly along a traveling direction of the signal light.

9. The wavelength conversion device according to claim 1, wherein
the substrate is $LiNbO_3$ (lithium niobate), $KNbO_3$ (potassium niobate), $LiTaO_3$ (lithium tantalate), $LiNb_{(x)}Ta_{(1-x)}O_3$ ($0 \leq x \leq 1$) (lithium tantalate of a nonstoichiometric composition), or $KTiOPO_4$ (potassium titanate phosphate), and further includes at least one selected from Mg (magnesium), Zn (zinc), Sc (scandium), or In (indium) therein as an additive.

* * * * *